US012443201B2

(12) United States Patent
Bandi et al.

(10) Patent No.: US 12,443,201 B2
(45) Date of Patent: Oct. 14, 2025

(54) SYSTEM AND METHOD OF ADJUSTING THE AUTOMATED PLANT MARSHALING BASED ON DYNAMIC RF SIGNALS

(71) Applicant: Ford Motor Company, Dearborn, MI (US)

(72) Inventors: Krishna Bandi, Novi, MI (US); Gregory P. Linkowski, Dearborn, MI (US); Meghna Menon, Ann Arbor, MI (US); Mario Anthony Santillo, Canton, MI (US)

(73) Assignee: Ford Motor Company, Dearborn, MI (US)

( * ) Notice: Subject to any disclaimer, the term of this patent is extended or adjusted under 35 U.S.C. 154(b) by 176 days.

(21) Appl. No.: 18/518,152

(22) Filed: Nov. 22, 2023

(65) Prior Publication Data

US 2024/0184301 A1    Jun. 6, 2024

Related U.S. Application Data

(60) Provisional application No. 63/430,503, filed on Dec. 6, 2022.

(51) Int. Cl.
*H04W 4/02* (2018.01)
*G05D 1/225* (2024.01)
*H04B 17/309* (2015.01)
*H04W 4/33* (2018.01)
*H04W 4/40* (2018.01)

(52) U.S. Cl.
CPC .......... *G05D 1/225* (2024.01); *H04B 17/309* (2015.01); *H04W 4/02* (2013.01); *H04W 4/33* (2018.02); *H04W 4/40* (2018.02)

(58) Field of Classification Search
CPC ....... G05D 1/225; H04B 17/309; H04W 4/33; H04W 4/40; H04W 4/02
See application file for complete search history.

(56) References Cited

U.S. PATENT DOCUMENTS

| 2019/0222652 | A1 | 7/2019 | Graefe et al. |
| 2019/0378150 | A1 | 12/2019 | Patsiokas et al. |
| 2020/0229137 | A1 | 7/2020 | Rubin et al. |
| 2022/0110018 | A1 | 4/2022 | Jha et al. |
| 2022/0182793 | A1 | 6/2022 | Graefe et al. |
| 2022/0217568 | A1 | 7/2022 | Mach |
| 2022/0332350 | A1 | 10/2022 | Jha et al. |
| 2023/0145508 | A1 | 5/2023 | Kaphengst et al. |

FOREIGN PATENT DOCUMENTS

| EP | 4073780 | 10/2022 |
| EP | 4088267 | 11/2022 |
| WO | 2021194590 | 9/2021 |

*Primary Examiner* — Mathew Franklin Gordon
(74) *Attorney, Agent, or Firm* — Burris Law, PLLC (57) ABSTRACT

A method for controlling vehicle movement includes: obtaining, by a vehicle, at least one radio frequency (RF) signal metric for a plurality of RF signals broadcasted in a manufacturing environment; broadcasting, by the vehicle, a vehicle message when the at least one RF signal metric satisfies at least one RF communication issue condition; generating, by an infrastructure system, an RF map based on the vehicle message and at least one additional vehicle message from at least one additional vehicle; and dynamically adjusting an infrastructure message, by the infrastructure system, based on the RF map when the vehicle autonomously navigates within the manufacturing environment.

20 Claims, 4 Drawing Sheets

SYSTEM AND METHOD OF ADJUSTING THE AUTOMATED PLANT MARSHALING BASED ON DYNAMIC RF SIGNALS

CROSS-REFERENCE TO RELATED APPLICATION

This application claims the benefit of and priority to U.S. Provisional Application No. 63/430,503, filed on Dec. 6, 2022, and titled "SYSTEM AND METHOD OF ADJUSTING THE AUTOMATED PLANT MARSHALLING BASED ON DYNAMIC RF SIGNALS", the contents of which are incorporated herein by reference in its entirety.

FIELD

The present disclosure relates to controlling a vehicle based on a radio frequency signal.

BACKGROUND

The statements in this section merely provide background information related to the present disclosure and may not constitute prior art.

In a manufacturing environment, a vehicle may wirelessly communicate with other components to autonomously navigate within the manufacturing environment. Specifically, the vehicle may transmit and receive radio frequency (RF) signals. However, various types of RF communication issues, such as network congestion, packet delays, signal interference, and degradation of signal strength from aging hardware can inhibit the transmission or reception of RF signals in the manufacturing environment. As an example, delays between the infrastructure and the vehicle can result in unexpected stops that cascade through a line of marshalled vehicles causing traffic congestion. As such, the efficiency of the vehicle movement during autonomous navigation may be inhibited by RF communication issues.

It is common for manufacturing environments to perform RF surveys periodically to evaluate the RF communication issues. However, this occasional snapshot can mean that suboptimal states can persist for weeks or months before they are found. Moreover, transient issues (e.g., a user creating an interfering hotspot) may never be diagnosed. The dynamic nature of such RF communication issues makes it difficult to diagnose issues that are reliant on frequent, timely communications. Further, it is tough to determine which area/spot in the manufacturing environment has encountered a given type of RF communication issue, thereby inhibiting the performance capabilities of the vehicle within the manufacturing environment.

SUMMARY

This section provides a general summary of the disclosure and is not a comprehensive disclosure of its full scope or all of its features.

The present disclosure provides a system for controlling vehicle movement in a manufacturing environment. The system includes a vehicle and an infrastructure system. The vehicle is configured to obtain location data from a global navigation satellite system (GNSS) sensor, obtain one or more radio frequency (RF) signal metrics for a plurality of RF signals broadcasted in a manufacturing environment, generate a vehicle sensor snapshot associated with the one or more RF signal metrics and the location data when the one or more RF signal metrics satisfy an RF communication issue condition, and broadcast a vehicle message to the infrastructure system when the one or more RF signal metrics satisfy the RF communication issue condition, wherein the vehicle message includes the vehicle sensor snapshot, the one or more RF signal metrics, the location data, and a timestamp associated with the vehicle sensor snapshot. The infrastructure system is configured to generate an RF map based on the vehicle message and one or more additional vehicle messages associated with one or more additional vehicles, determine whether a number of the vehicle message and the one or more additional vehicle messages is greater than a threshold number, and broadcast an infrastructure message in response to the number being greater than the threshold number, where the infrastructure message comprises instructions for performing one or more corrective actions.

In one form, a method for controlling vehicle movement is provided, which includes: obtaining, by a vehicle, at least one radio frequency (RF) signal metric for a plurality of RF signals broadcasted in a manufacturing environment; broadcasting, by the vehicle, a vehicle message when the at least one RF signal metric satisfies at least one RF communication issue condition; generating, by an infrastructure system, an RF map based on the vehicle message and at least one additional vehicle message from at least one additional vehicle; and dynamically adjusting an infrastructure message, by the infrastructure system, based on the RF map when the vehicle autonomously navigates within the manufacturing environment.

In other features, dynamically adjusting the infrastructure message includes broadcasting, by the infrastructure system, the infrastructure message including instructions to perform a corrective action. The corrective action includes: reporting the at least one RF communication issue to one or more plant facilities; and/or adjusting one or more parameters of the infrastructure message broadcasted to the vehicle and the at least one additional vehicle. Adjusting one or more parameters of the infrastructure message includes: reducing a vehicle speed of the vehicle and the at least one additional vehicle within a given area that has the at least one RF communication issue condition; and/or adjusting a route of the vehicle and the at least one additional vehicle to stay away from the given area. The at least one RF communication issue condition includes at least one of network congestion, packet delays, signal interference, and degradation of signal strength. The infrastructure system collects the at least one RF signal metric and pairs locations of the vehicle and the at least one additional vehicle to create the RF map. The at least one RF signal metric is selected from a group consisting of all access points broadcasting on predetermined channels, signal strength, reference signal received power, reference signal received quality, signal to noise ratio, packet loss, bandwidth, throughput, RF signal interference, network congestion, latency, and an interpacket gap.

In a variant, the method further includes: obtaining, by the vehicle, location data of the vehicle; generating, by the vehicle, a vehicle sensor snapshot associated with the at least one RF signal metric and the location data when the at least one RF signal metric satisfies the at least one RF communication issue condition; and determining, by the infrastructure system, whether a number of the vehicle messages from the vehicle and the at least one additional vehicle is greater than a threshold number. The vehicle message includes the vehicle sensor snapshot, the at least one RF signal metric, the location data of the vehicle, and a timestamp associated with the vehicle sensor snapshot. The infrastructure system performs a corrective action to correct the at least one RF communication issue condition when the number of the vehicle message and the at least one additional vehicle message is greater than a threshold number within a predetermined period of time in a given area.

In another form of the present disclosure, a method for controlling vehicle movement is provided, which includes: obtaining, by a vehicle, at least one radio frequency (RF) signal metric for a plurality of RF signals broadcasted in a manufacturing environment; broadcasting, by the vehicle, a vehicle message when the at least one RF signal metric satisfies at least one RF communication issue condition; dynamically adjusting, by an infrastructure system, an infrastructure message based on the vehicle message.

In a variant, the method further includes: generating, by the vehicle, a vehicle sensor snapshot associated with the at least one RF signal metric and location data when the at least one RF signal metric satisfies the RF communication issue condition; generating, by the infrastructure system, an RF map based on the vehicle message; and dynamically adjusting the infrastructure message based on the RF map. The infrastructure message includes instructions to perform a corrective action. The corrective action includes at least one of: reporting the at least one RF communication issue to one or more plant facilities; adjusting one or more parameters of the infrastructure message broadcasted to the vehicle; reducing a vehicle speed within a given area that has the at least one RF communication issue condition; and adjusting a route of the vehicle to stay away from the given area.

In still another form, a method for controlling vehicle movement is provided, which includes: obtaining, by a vehicle fleet, at least one radio frequency (RF) signal metric for a plurality of RF signals broadcasted in a manufacturing environment, when the vehicle fleet autonomously navigates within the manufacturing environment; broadcasting, by the vehicle fleet, a vehicle message including the at least one RF signal metric to an infrastructure system when at least one RF communication issue condition is satisfied; mapping, by the infrastructure system, location data of the vehicle fleet to the at least one RF signal metric for the vehicle fleet to generate an RF map; and performing, by the infrastructure system, a corrective action to correct the at least one RF communication issue condition based on the RF map.

In other features, the vehicle messages include the vehicle sensor snapshot, the at least one RF signal metric, the location data of the vehicle, and a timestamp associated with the vehicle sensor snapshot. The infrastructure system performs a corrective action to correct the at least one RF communication issue condition when the infrastructure system determines that a number of the vehicle message is greater than a threshold number within a predetermined period of time in a given area.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
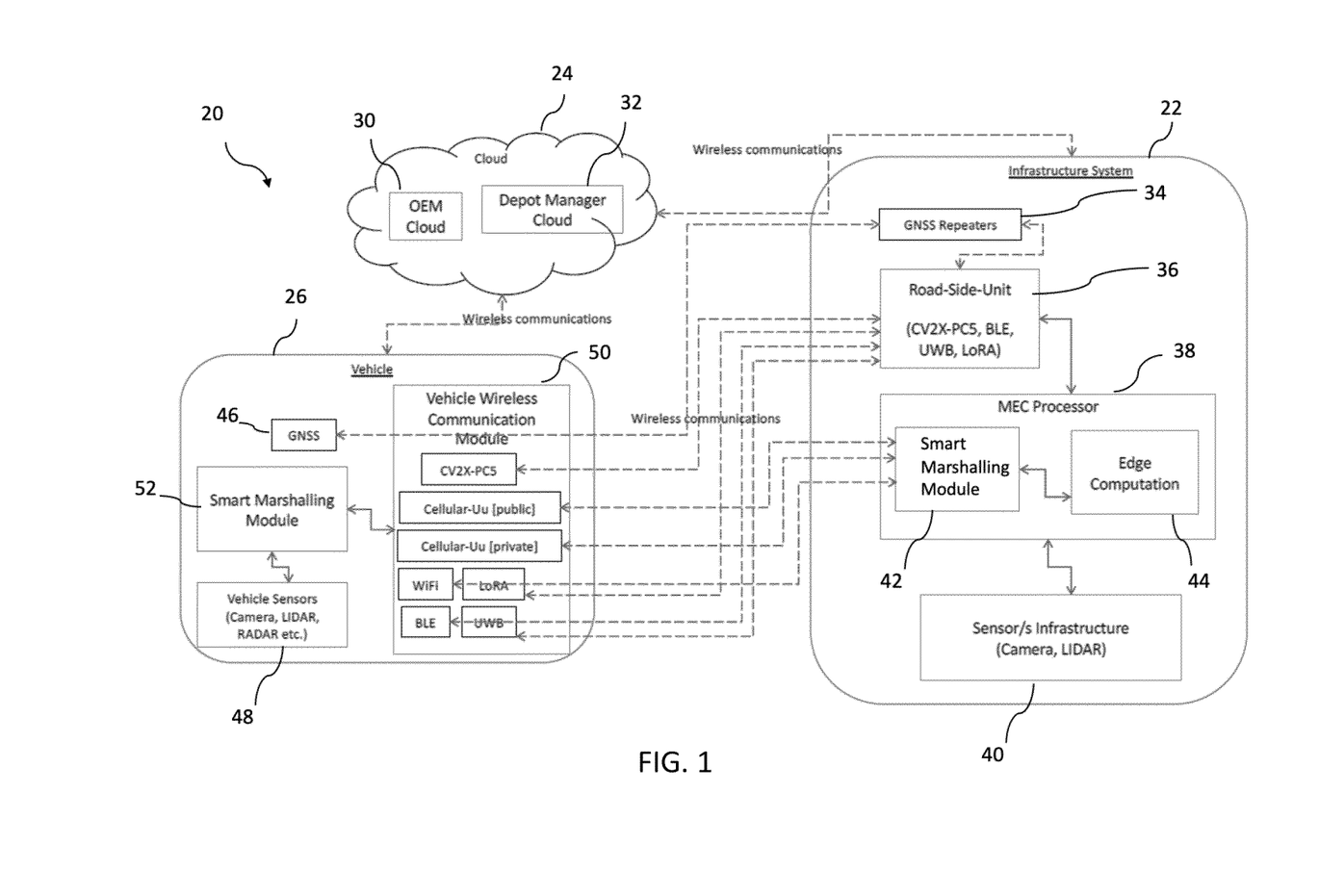
FIG. 1 is a block diagram of a system for controlling vehicle movement in a manufacturing environment in accordance with the teachings of the present disclosure.

Referring to FIG. 1, a system 20 for controlling vehicle movement in a manufacturing environment in accordance with the teachings of the present disclosure includes an infrastructure system 22, a cloud 24, and a vehicle fleet including a plurality of vehicles 26 (only one is shown). The vehicles 26 may autonomously navigate in a marshaling zone 27 (shown in FIG. 2) in the manufacturing environment. The autonomous navigation of the vehicle may be interchangeably referred to as "vehicle marshaling" herein.

The infrastructure system 22, the cloud 24, and the vehicles 26 are communicably coupled using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, a PC5-based cellular vehicle-to-infrastructure communication system, among others). Any one of the components of the infrastructure system 22, the cloud 24, and the vehicles 26 may be provided at the same or different locations (e.g., one or more edge computing devices).

The cloud 24 includes a vehicle manufacturing original equipment manufacturer (OEM) cloud 30 and a depot manager cloud 32. The OEM cloud 30 is configured to store data related to each vehicle manufactured by the OEM. This information may include, but is not limited to, a vehicle identification number, data related to components installed in the vehicle (e.g., a bill of material with part numbers), and/or one or more software-based tasks to be performed by the vehicle. The OEM cloud 30 may include controllers, computing devices, servers, modems, and/or other components (not shown) for performing the various functions described herein.

The depot manager cloud 32 may include controllers, computing devices, servers, modems and other components (not shown) for performing the various functions described herein. The depot manager cloud 32 is configured to obtain the RF information from the vehicles 26 and take one or more actions to address or resolve the RF communication issue. The depot manager cloud 32 activates the automated vehicle marshaling features on the vehicles 26 and provides the instructions for each vehicle regarding day-to-day or hourly activities. Once activated, the vehicle information obtains the status from the infrastructure system 22. The depot manager cloud 32 provides data relating to the activity of each vehicle 26 to the infrastructure system 22, such as loading, unloading, charging, etc. The infrastructure system 22 then controls the vehicle movement based on the data received from the depot manager cloud 32 and the smart marshaling routine, which will be described in more detail below.

The infrastructure system 22 includes global navigation satellite system (GNSS) repeaters 34, a roadside unit (RSU) 36, a MEC processor 38, and infrastructure sensors 40. The GNSS repeater 34 includes antennas and a repeater module. The repeater module replicates GNSS signals obtained from a GNSS satellite via the antennas using known GNSS replication routines and broadcasts the replicated GNSS signals to the vehicles 26. Accordingly, the GNSS repeaters 34 may include various components for performing the operations described herein, such as, but not limited to, transceivers, processor circuits, memory circuits, routers, and/or input/output interface hardware.

The infrastructure sensors 40 may be image sensors that provide image data of the manufacturing environment to the MEC processor 38. In one form, the infrastructure sensors 40 provide pose, routing, and obstacle data of the manufacturing environment to the infrastructure processor. In one form, the infrastructure sensors 40 are provided on an infrastructure element within the manufacturing environment, such as a tower, a light pole, a building, a sign, among other fixed elements of the manufacturing environment. In one form, the infrastructure sensors 40 are disposed on a moveable element within the manufacturing environment, such as an unmanned aerial vehicle (UAV). The infrastructure sensors 40 may include, but are not limited to, a two-dimensional (2D) camera, a three-dimensional (3D) camera, an infrared sensor, a radar scanner, a laser scanner, a light detection and ranging (LIDAR) sensor, an ultrasonic sensor, among others.

The RSU 36 is equipped with a cellular vehicle-to-infrastructure communication system (referred to as "CV2X systems"). As an example, the RSU 36 is equipped with a PC5-based C-V2X that employs a RF sidelink communication for low latency vehicle sensor connectivity. The roadside unit 36 is configured to broadcast, for example, the infrastructure sensor data to the vehicles 26 via a wireless communication module 45 (shown in FIG. 2) using one or more wireless communication protocols, such as a CV2X protocol, a private and/or public cellular protocol, a Wi-Fi protocol, a long range (LoRA) signal protocol, a Bluetooth protocol, and/or a UWB protocol. The RSU 36 is also configured to receive messages from the vehicles 26. Accordingly, the RSU 36 may include various components for performing the operations described herein, such as, but not limited to, transceivers, processor circuits, memory circuits, routers, and/or input/output interface hardware.

The MEC processor 38 includes a smart marshaling module 42 and an edge computation module 44. The MEC processor 38 is configured to perform an autonomous marshaling routine based on the infrastructure sensor data obtained by the infrastructure sensors 40.

The vehicles 26 each include a global navigation satellite system (GNSS) sensor 46, one or more vehicle sensors 48, a vehicle wireless communication module 50, and a smart marshaling module 52. The GNSS sensor 46 is configured to generate location data (such as GNSS coordinate) of the vehicles 26, but it should be understood that other types of location sensors may be employed to generate the location data, such as an indoor positioning system-based sensor. In one form, the GNSS sensor 48 may be communicably coupled to the GNSS repeater 34 via the vehicle wireless communication module 50 to increase the accuracy of the GNSS coordinate.

The one or more vehicle sensors 48 are configured to generate vehicle sensor data corresponding to detected objects surrounding the vehicle 26. As an example, the one or more vehicle sensors 48 may be image sensors (e.g., a 2D camera, a 3D camera, an infrared sensor, a radar scanner, a laser scanner, a LIDAR sensor, an ultrasonic sensor, among others).

The vehicle wireless communication module 50 is configured to provide a communication interface between the vehicle 26 and the infrastructure system 22 and/or the cloud 24. Accordingly, the vehicle wireless communication module 50 may include various components for performing the operations described herein, such as, but not limited to, transceivers, processor circuits, memory circuits, routers, and/or input/output interface hardware.

Figure 2:
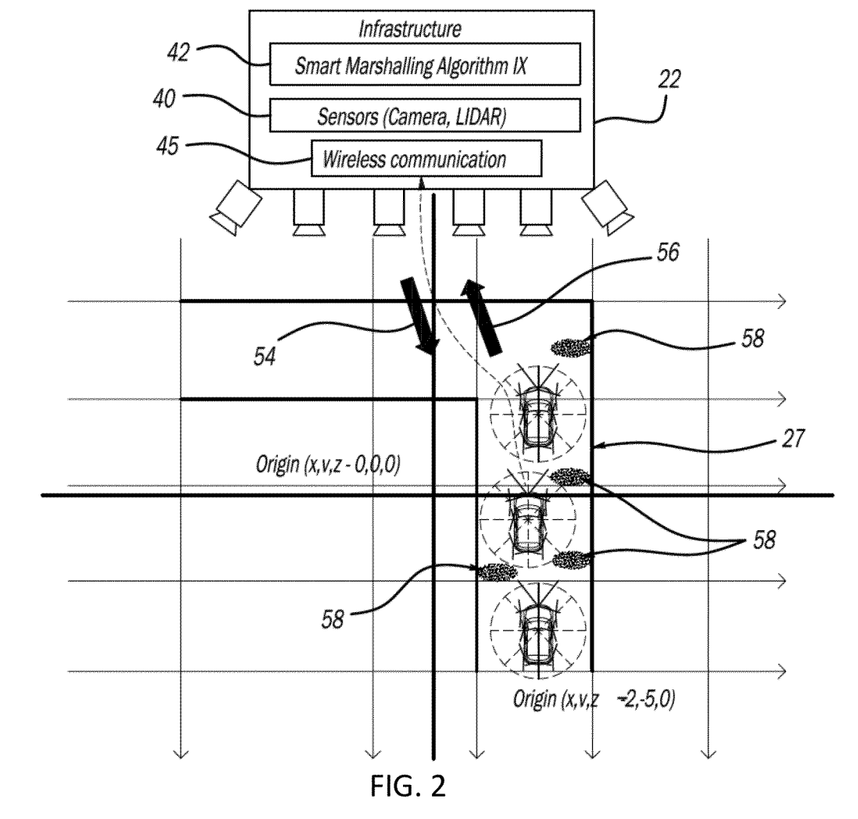
FIG. 2 is a block diagram of a vehicle and an infrastructure system, showing communications therebetween to perform a smart marshaling routine in accordance with the teachings of the present disclosure.

Referring to FIG. 2, the infrastructure system 22 and the vehicle 26 communicate with each other continuously or at a predetermined interval to perform the smart marshaling routine. The infrastructure system 22 is configured to broadcast infrastructure messages 54 (hereinafter "PCIM" messages 54) in the form of the RF signals to the plurality of vehicles 26 with commands relating to vehicle autonomous navigation in the manufacturing environment (i.e., the manufacturing plant). The smart marshaling module 52 of each vehicle 26 is configured to receive one or more radio frequency (RF) metrics for a plurality of RF signals (i.e., the infrastructure messages 54) broadcasted in the manufacturing environment and measures one or more RF signal metrics of the PCIM message 54. The one or more RF signal metrics include, but are not limited to: all access points broadcasting on the desired channels; signal strength (e.g.: received signal strength indicator (RSSI), reference signal received power (RSRP), reference signal received quality (RSRQ)); signal to noise ratio (SNR); packet loss, bandwidth, and/or throughput; RF signal interference; network congestion; latency; and/or an interpacket gap (IPG)).

The smart marshaling module 52 of each vehicle 26 compares an RF signal metric of the PCIM message 54 to a threshold RF signal metric to determine whether an RF communication issue condition is satisfied. The smart marshaling module 52 of the vehicle 26 may determine that an RF communication is satisfied when the RF signal metric exceeds or is below a threshold RF signal metric, depending on the particular RF signal metric being analyzed and compared. If the RF communication issue condition is satisfied, the smart marshaling module 52 of the vehicle 26 broadcasts a vehicle message 56 to the infrastructure system 22. The vehicle message 56 is referred to hereinafter as "the PCVM message 56."

The vehicle message 56 includes one or more RF signal metrics being compared, the location of the vehicle (e.g., an XYZ coordinate and/or GNSS coordinate), and a vehicle sensor snapshot of data. The location of the vehicle 26 may be obtained from the global navigation satellite system (GNSS) sensor 46 of the vehicle 26. The vehicle sensor snapshot records the environmental location imaginary area data of an area corresponding to the RF communication issue. Therefore, the vehicle sensor snapshot of the data may be an image of an area corresponding to the RF communication issue and a three-dimensional coordinate of the image. The vehicle sensor snapshot may be obtained from the one or more vehicle sensors 48, such as onboard cameras and other vision-related sensing (e.g., a front windshield camera, a rearview camera etc.).

The MEC processor 38 of the infrastructure system 22, particularly the smart marshaling module 42 contained therein, receives the PCVM message 54 from multiple vehicles 26. The MEC processor 38 aggregates PCVM messages 54 received from multiple vehicles 26 to generate (or update) an RF map of the manufacturing environment. An RF map is a representation of how RF signals are spread in the space, i.e., the manufacturing environment. If the MEC processor 38 receives a number of PCVM messages 54 associated with a given area 58 from one or more vehicles 26 and if the number is greater than a threshold number within a predetermined period of time, the MEC processor 38 determines that the given area 58 has an RF communication issue (i.e., the given area 58 is an RF interference spot or a degraded spot) and performs a corrective action.

The corrective action may include reporting the RF communication issue to one or more plant facilities for mitigating the RF communication issue. The corrective action may also include adjusting one or more parameters of the PCIM messages 54 broadcasted to the vehicles 26, such as adjusting the speed commands, way-point control, and/or routes broadcasted to the vehicles 26 to accommodate for the RF communication issue of the given area 58. As an example, the PCIM message 54 may include autonomous vehicle navigation instructions that correspond to reducing the vehicle speed within the given area 58 or adjusting the route to stay away from the given area 58.

Figure 3:
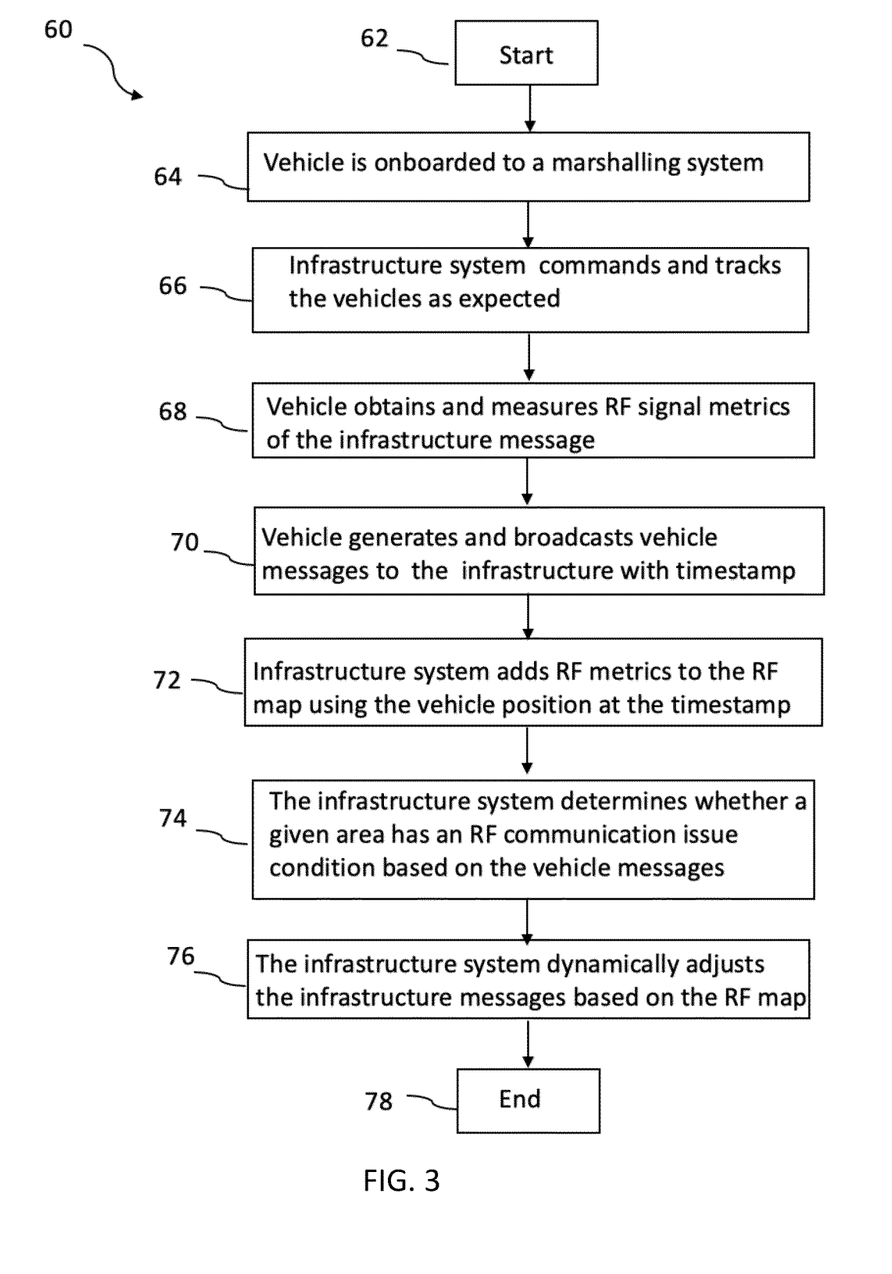
FIG. 3 is a flowchart of a method for controlling vehicle movement in a manufacturing environment in accordance with the teachings of the present disclosure.

Referring to FIG. 3, a flowchart of a method 60 for controlling vehicle movement in a manufacturing environment is shown. The method 60 performs a smart marshaling routine of the vehicles 26 and starts with step 62. The vehicles 26 are onboarded to a marshaling system at step 64. The marshaling system includes the smart marshaling module 42 of the infrastructure system 22 and the smart marshaling module 42 of the vehicle 26. Next, the infrastructure system 22 commands and tracks the vehicles 26 by broadcasting the infrastructure messages 54 to the vehicles 26 as the vehicles 26 navigate through the manufacturing environment at step 66. The vehicles 26 obtain and measure one or more RF signal metrics of the infrastructure messages 54 at step 68. When the one or more RF signal metric satisfies at least one RF communication issue condition, the vehicles 26 also obtain the location data of the vehicles 26 from the GNSS sensor 46 of the vehicles 26 and a vehicle snapshot associated with the at least one RF signal metric from the vehicle sensors 48. The vehicles 26 then generate and broadcast vehicle messages 56 to the infrastructure system 22 at step 70. The vehicle messages 56 include the vehicle sensor snapshot, the at least one RF signal metric, the location data of the vehicles 26 with corresponding timestamp associated with the vehicle sensor snapshot.

Upon receipt of the vehicles messages 26, the infrastructure system 22 adds RF signal metrics to the RF map using the position data of the vehicles 26 at the timestamp at step 72. In other words, the infrastructure system 22 collects the RF signal metrics and pairs the location of the vehicles to generate and update the RF map. The infrastructure system 22 determines whether a given area has an RF communication issue condition based on the vehicle messages at step 74. When a number of the vehicle messages broadcasted from the vehicles 26 is greater than a threshold number within a predetermined period of time, the infrastructure system 22 determines that a given area has an RF communication issue condition. The RF map with the location data (x, y, z location) of the vehicles 26 allows the infrastructure system 22 to take a corrective action in terms of the given area to mitigate the RF communication issue. The corrective action may include reporting the RF communication issue to one or more plant facilities for mitigating the RF communication issue, adjusting one or more parameters of the PCIM messages 54 broadcasted to the vehicles 26, such as adjusting the speed commands, way-point control, and/or routes broadcasted to the vehicles 26 to accommodate for the RF communication issue of the given area 58. The infrastructure system 22 then dynamically adjusts the infrastructure messages 54 based on the RF map as the vehicles 26 autonomously navigates within the manufacturing environment at step 76. The method 60 ends at step 78.

Figure 4:
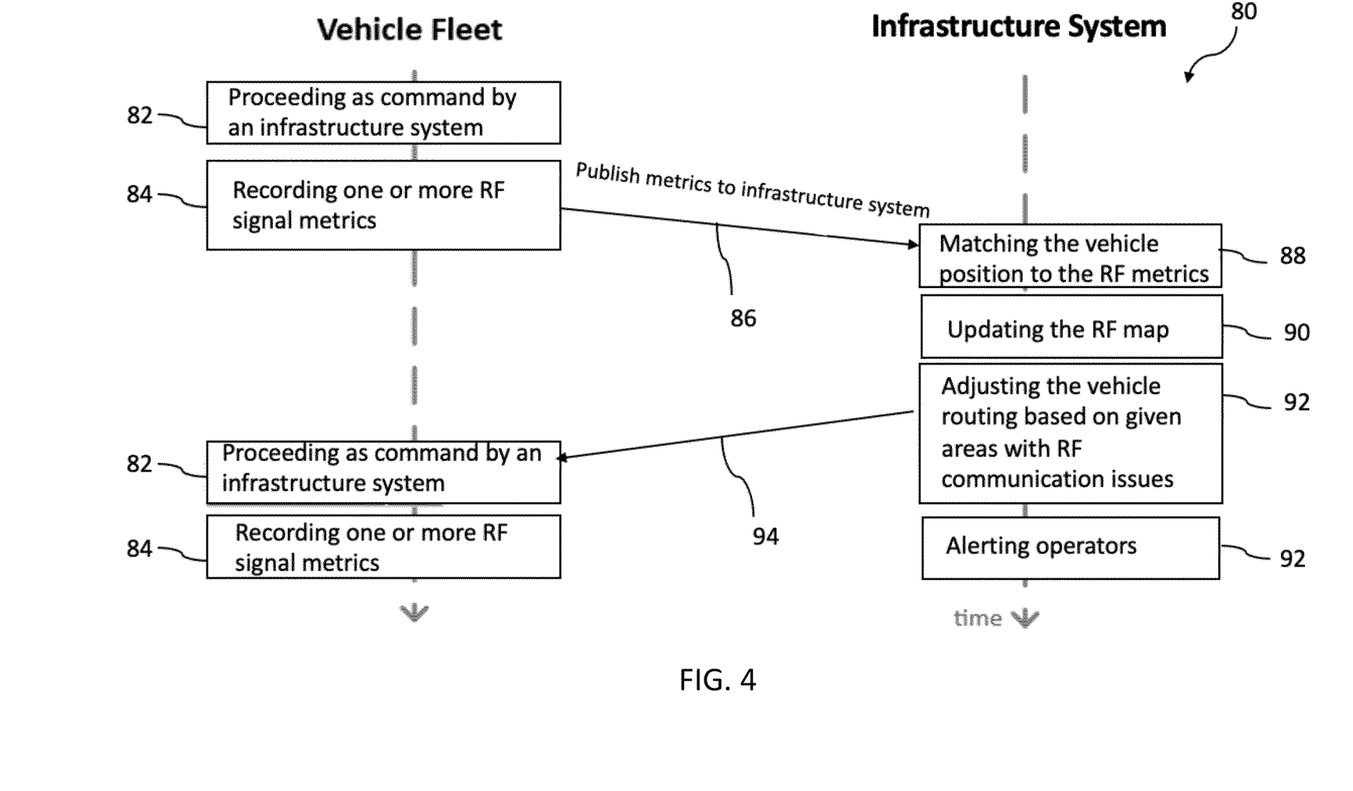
FIG. 4 is a flowchart of a method for controlling vehicle movement in a manufacturing environment, showing communications between a vehicle or a vehicle fleet and an infrastructure system in accordance with the present disclosure.

Referring to FIG. 4, a block diagram of a method 80 for controlling vehicle movement in a manufacturing environment is shown. The method 80 includes proceeding, by a vehicle fleet, as commanded by an infrastructure system 22 at step 82 and recording, by the vehicle fleet, the one or more RF signal metrics at step 84; and publishing, by the vehicle fleet, the one or more RF signal metrics to the infrastructure system 22 at step 86. The method 80 further comprises: upon receipt of the one or more RF signal metrics from the vehicle fleet, matching, by the infrastructure system 22, the vehicle position to the RF signal metrics at step 88; updating, by the infrastructure system 22, the RF map at step 90; adjusting, by the infrastructure system 22, the vehicle routing based on given areas 58 associated with RF communication issues at step 92; and alerting, by the infrastructure system 22, operators based on the given areas 58 associated with RF communication issues; and publishing the commands to the vehicle fleet at step 94. The method 80 that includes steps 82 to step 92 may be continuously repeated.

The system and method for controlling vehicle movement in accordance with the teachings of the present disclosure provide RF surveying routines and control vehicle movement based on the RF surveying routines. Specifically, the vehicles 26 perform RF surveying routines by analyzing/comparing the RF signal metrics of the RF signals and generate vehicle messages that includes the RF signal metrics, the location data of the vehicles (e.g., an XYZ coordinate and/or GNSS coordinate), and a vehicle sensor snapshot of the data when an RF communication issue condition is satisfied. Upon receipt of the vehicle messages, the infrastructure system 22 generates the RF map and dynamically adjusts broadcasted PCIM messages based on the RF map as the vehicle autonomously navigates within the environment.

The system and method according to the teachings of the present disclosure provide continuous mapping of relevant RF signals over the space in which the vehicle marshaling routines are performed in the manufacturing plants environment. The vehicles 26 can perform live reporting of trouble spots while performing the vehicle marshaling routines by employing the vehicle sensors and RF signal mapping characteristics. While performing the vehicle marshaling routines, the vehicles 26 report, at regular intervals, a set of metrics corresponding to the RF signals observed by each vehicle 26 at a particular timestamp. The infrastructure system 22 collects those metrics and pairs the location to the vehicle location (e.g., (X, Y, Z) location) at that time to create a map of the RF coverage (i.e., the RF map).

In addition to generating the RF map and determining the dynamic characteristic, the infrastructure system 22 adjusts the signal characteristics of the broadcasted signals based on the RF map. As an example, the infrastructure system 22 adjusts known weak spots by reflecting in the PCIM message: adjusting PCIM transmission and way-points information accordingly for respective RF areas; adjusting vehicle speed to accommodate expected communication delays and to maintain enough buffer; instructing the vehicle to adjust its path to a zone having RF communication issues so that the vehicles 26 do not wait for commands in a weak RF zone; adjusting traffic patterns to stay away from the given area 58 having the RF communication issues, such as reducing vehicle density near the given area 58 having RF communication issues to prevent cascading stops; alerting operators and/or broadcasting alerts based on the RF communication issues; and dynamically adjust the parameters of the PCIM message 54 based on the RF characteristics reported by the vehicles 26.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling vehicle movement, comprising:
    obtaining, by a vehicle, at least one radio frequency (RF) signal metric for a plurality of RF signals broadcasted in a manufacturing environment;
    broadcasting, by the vehicle, a vehicle message when the at least one RF signal metric satisfies at least one RF communication issue condition;
    generating, by an infrastructure system, an RF map based on the vehicle message and at least one additional vehicle message from at least one additional vehicle; and
    dynamically adjusting an infrastructure message, by the infrastructure system, based on the RF map when the vehicle autonomously navigates within the manufacturing environment.

2. The method according to claim 1, wherein the dynamically adjusting the infrastructure message comprises broadcasting, by the infrastructure system, the infrastructure message including instructions to perform a corrective action.

3. The method according to claim 2, wherein the corrective action includes at least one of:
    reporting the at least one RF communication issue to one or more plant facilities;
    adjusting one or more parameters of the infrastructure message broadcasted to the vehicle and the at least one additional vehicle.

4. The method according to claim 3, wherein the adjusting one or more parameters of the infrastructure message includes at least one of:
    reducing a vehicle speed of the vehicle and the at least one additional vehicle within a given area that has the at least one RF communication issue condition; and
    adjusting a route of the vehicle and the at least one additional vehicle to stay away from the given area.

5. The method according to claim 1, wherein the at least one RF communication issue condition comprises at least one of network congestion, packet delays, signal interference, and degradation of signal strength.

6. The method according to claim 1, wherein the infrastructure system collects the at least one RF signal metric and pairs locations of the vehicle and the at least one additional vehicle to create the RF map.

7. The method according to claim 1, wherein the at least one RF signal metric is selected from a group consisting of all access points broadcasting on predetermined channels, signal strength, reference signal received power, reference signal received quality, signal to noise ratio, packet loss, bandwidth, throughput, RF signal interference, network congestion, latency, and an interpacket gap.

8. The method according to claim 1, further comprising obtaining, by the vehicle, location data of the vehicle.

9. The method according to claim 8, further comprising generating, by the vehicle, a vehicle sensor snapshot associated with the at least one RF signal metric and the location data when the at least one RF signal metric satisfies the at least one RF communication issue condition.

10. The method according to claim 9, wherein the vehicle message includes the vehicle sensor snapshot, the at least one RF signal metric, the location data of the vehicle, and a timestamp associated with the vehicle sensor snapshot.

11. The method according to claim 1, further comprising determining, by the infrastructure system, whether a number of the vehicle messages from the vehicle and the at least one additional vehicle is greater than a threshold number.

12. The method according to claim 11, wherein the infrastructure system performs a corrective action to correct the at least one RF communication issue condition when the number of the vehicle message and the at least one additional vehicle message is greater than a threshold number within a predetermined period of time in a given area.

13. A method for controlling vehicle movement, comprising:
- obtaining, by a vehicle, at least one radio frequency (RF) signal metric for a plurality of RF signals broadcasted in a manufacturing environment;
- broadcasting, by the vehicle, a vehicle message when the at least one RF signal metric satisfies at least one RF communication issue condition;
- dynamically adjusting, by an infrastructure system, an infrastructure message based on the vehicle message.

14. The method according to claim 13, further comprising generating, by the infrastructure system, an RF map based on the vehicle message, and dynamically adjusting the infrastructure message based on the RF map.

15. The method according to claim 14, wherein the infrastructure message includes instructions to perform a corrective action.

16. The method according to claim 15, wherein the corrective action includes at least one of:
- reporting the at least one RF communication issue to one or more plant facilities;
- adjusting one or more parameters of the infrastructure message broadcasted to the vehicle;
- reducing a vehicle speed within a given area that has the at least one RF communication issue condition; and
- adjusting a route of the vehicle to stay away from the given area.

17. The method according to claim 14, further comprising generating, by the vehicle, a vehicle sensor snapshot associated with the at least one RF signal metric and location data when the at least one RF signal metric satisfies the RF communication issue condition.

18. A method for controlling vehicle movement, comprising:
- obtaining, by a vehicle fleet, at least one radio frequency (RF) signal metric for a plurality of RF signals broadcasted in a manufacturing environment, when the vehicle fleet autonomously navigates within the manufacturing environment;
- broadcasting, by the vehicle fleet, vehicle messages including the at least one RF signal metric to an infrastructure system when at least one RF communication issue condition is satisfied;
- mapping, by the infrastructure system, location data of the vehicle fleet to the at least one RF signal metric to generate an RF map; and
- performing, by the infrastructure system, a corrective action to correct the at least one RF communication issue condition based on the RF map.

19. The method according to claim 18, wherein the vehicle messages include a vehicle sensor snapshot, the at least one RF signal metric, the location data of the vehicle, and a timestamp associated with the vehicle sensor snapshot.

20. The method according to claim 18, wherein the infrastructure system performs a corrective action to correct the at least one RF communication issue condition when the infrastructure system determines that a number of the vehicle message is greater than a threshold number within a predetermined period of time in a given area.

* * * * *